(12) United States Patent
Umberger et al.

(10) Patent No.: US 6,898,667 B2
(45) Date of Patent: May 24, 2005

(54) MANAGING DATA IN A MULTI-LEVEL RAID STORAGE ARRAY

(75) Inventors: David K. Umberger, Boise, ID (US); Guillermo Navarro, Boise, ID (US); Jonathan Condel, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 198 days.

(21) Appl. No.: 10/154,870

(22) Filed: May 23, 2002

(65) Prior Publication Data

US 2003/0221060 A1 Nov. 27, 2003

(51) Int. Cl.$^7$ .............................................. G06F 12/08
(52) U.S. Cl. ...................................................... 711/114
(58) Field of Search ........................................ 711/114

(56) References Cited

U.S. PATENT DOCUMENTS 5,392,244 A * 2/1995 Jacobson et al. ........... 711/114

OTHER PUBLICATIONS

"The Authoritative Dictornary of IEEE Standards Terms", IEEE Press, 2000, Seventh Edition, p. 1243.*
Microsoft Computer Dictionary, Microsoft Press, Fourth Edition, p. 357.*

* cited by examiner

Primary Examiner—Mano Padmanabhan
Assistant Examiner—Midys Inoa

(57) ABSTRACT

A system and methods implemented within a multi-level RAID (redundant array of independent disks) storage array operate to initially write data to a lower performing RAID level within the array. In addition, data is migrated between lower and higher performing RAID levels via data migration processes that function as background processes. Benefits of the disclosed system and methods include a non-disruptive environment for servicing host I/O (input/output) requests. Array response times are significantly reduced by not allowing initial data writes to interfere with higher performing RAID levels and by migrating data between lower and higher performing RAID levels in the background when the array is less busy servicing host I/O requests.

45 Claims, 8 Drawing Sheets

MANAGING DATA IN A MULTI-LEVEL RAID STORAGE ARRAY

TECHNICAL FIELD

The present disclosure relates to multi-level RAID storage arrays, and more particularly, to managing data within such arrays to optimize storage efficiency and performance.

BACKGROUND

Multi-level RAID (redundant array of independent disks) storage arrays provide better performance and storage efficiency than single level RAID storage arrays by exploiting advantages of different RAID levels combined within the same array. Multi-level RAID arrays employ two or more RAID levels such as RAID level 1 and RAID level 5 that coexist on the same set of disks within the array. Generally, different RAID levels provide different benefits of performance versus storage efficiency. For example, RAID level 1 provides low storage efficiency because disks are mirrored for data redundancy, while RAID level 5 provides higher storage efficiency by creating and storing parity information on one disk that provides redundancy for data stored on a number of disks. However, RAID level 1 provides faster performance under random data writes than RAID level 5 because RAID level 1 does not require the multiple read operations that are necessary in RAID level 5 for recreating parity information when data is being updated (i.e. written) to a disk.

Multi-level RAID arrays migrate data between different RAID levels within the array to maximize the benefits of performance and storage efficiency offered by the different RAID levels. Generally, active data (i.e., data most recently written) is migrated from a lower performing RAID level to a higher performing RAID level, while inactive data (i.e., data least recently written) is migrated from a lower storage-efficient RAID level to a higher storage-efficient RAID level. Migration of data from a lower performance RAID level to a higher performance RAID level is called "promotion". Migration of data from a higher performance RAID level to a lower performance RAID level is called "demotion". Thus, for a multi-level RAID array employing RAID levels 1 and 5, for example, active data is promoted to RAID level 1 from RAID level 5, and inactive data is demoted from RAID level 1 to RAID level 5.

Although data migration between RAID levels in a multi-level RAID array generally helps to optimize performance and storage efficiency of the array, past methods of migrating data have several disadvantages. One disadvantage with past methods is that promotions are performed in the foreground while an array is servicing a write request. Foreground promotions inflate response times for a data write because the data write has to wait for the full promotion process to conclude before the data write can be considered finished.

A promotion (i.e., data migration) involves several operations. Assuming, for example, that a multi-level RAID array employs RAID level 1 and RAID level 5, the promotion process first requires that the block of data being updated by a data write be read from RAID level 5 (i.e., the slower performing RAID level) into memory on the array. The data write is then written to RAID level 1 (i.e., the faster performing RAID level). The size of the data block being promoted is typically much larger than the size of the original data write. Such foreground promotions, which include an extra read and write of the data block being promoted, incur a penalty that makes the service time for the data write much longer than it would be without the promotion. As mentioned in the previous paragraph, data write response times are inflated because the foreground promotion process has to wait for the extra read and write of a block of data that is typically larger than the size of the data write.

Another disadvantage with past methods of migrating data between RAID levels in a multi-level RAID array is that background demotions are not integrated with foreground promotions. Therefore, when a higher (i.e., faster) performing RAID level (e.g., RAID level 1) runs out of space, a promotion triggers a disruptive foreground demotion process to make space available in the higher performing RAID level by demoting data to a lower performing RAID level. Under these circumstances, the promotion process described above cannot take place until a demotion process occurs.

In an example demotion process, data is read from the higher performing RAID level 1 and merged into the block of data in memory that is to be written to the lower performing RAID level 5. The parity of the RAID level 5 block of data to be written is then computed, and the data block and the parity are written to RAID level 5. This process is called a "read, modify, write". The size of the data block being demoted from RAID level 1 to RAID level 5 is typically much larger than the size of the original data write that instigated the demotion. Thus, the demotion process not only incurs time penalties for the "read, modify, write" process, but also incurs additional time penalties because the data block being demoted is typically larger in size than the original data write. Therefore, data write requests can result in response times that are orders of magnitude longer than would otherwise be necessary for a simple data write.

Accordingly, the need exists for a way to manage data in a multi-level RAID storage array that overcomes the penalties associated with current data migration methods and that optimally exploits advantages in performance and storage efficiency inherent to different RAID levels combined within an array.

SUMMARY

A system and methods implement non-disruptive data migration processes in a multi-level RAID (redundant array of independent disks) storage array. Newly written data is initially written to a lower performing RAID level. The data migration processes promote recently written data from the lower performing RAID level to a higher performing RAID level and demote older data from the higher performing RAID level to the lower performing RAID level. The migration processes operate in the background during times when the array utilization rate is low so that there is little or no adverse impact on the speed with which foreground host I/O (input/output) requests are processed by the array.

In one embodiment, a data migration process begins with a search for migratable data. Migratable data is found by comparing the age of data in a low performing RAID level with the age of data in a higher performing RAID level. If the search yields migratable data, the process continues by checking the utilization rate of the array. If the utilization rate is low, indicating the array is not very busy, then the migratable data is migrated to appropriate RAID levels within the array. If migratable data is not found or if the utilization rate is too high, the migration process terminates and is reinitiated at a later time.

In another embodiment, a data promotion process determines if blocks of data in a lower performing RAID level are promotion candidates. Promotion candidates are determined by which blocks of data have been most recently updated. If a promotion candidate is found, a utilization check process is initiated to monitor the utilization rate of the array. If the utilization rate reaches a certain threshold level that indicates the array is not very busy, then promotion candidates are promoted from the lower performing RAID level to a higher performing RAID level.

In still another embodiment, a data demotion process determines if blocks of data in a higher performing RAID level are demotion candidates. Demotion candidates are determined by comparing a last update time to an update time threshold, such as 24 hours. Thus, a block of data in the higher performing RAID level that has not been updated within the past 24 hours is considered a demotion candidate. If a demotion candidate is found, the utilization rate of the array is checked as previously discussed, and demotion candidates are demoted from the higher performing RAID level to a lower performing RAID level when the utilization rate indicates that the array is not busy.

BRIEF DESCRIPTION OF THE DRAWINGS

The same reference numbers are used throughout the drawings to reference like components and features.

DETAILED DESCRIPTION

A system and methods implemented within a multi-level RAID (redundant array of independent disks) storage array operate to initially write data to a lower performing RAID level within the array. In addition, data is migrated between lower and higher performing RAID levels via data migration processes that function as background processes. Benefits of the disclosed system and methods include a non-disruptive environment for servicing host I/O (input/output) requests. Array response times are significantly reduced by not allowing initial data writes to interfere with higher performing RAID levels and by migrating data between lower and higher performing RAID levels in the background when the array is less busy servicing host I/O requests.

Figure 1:
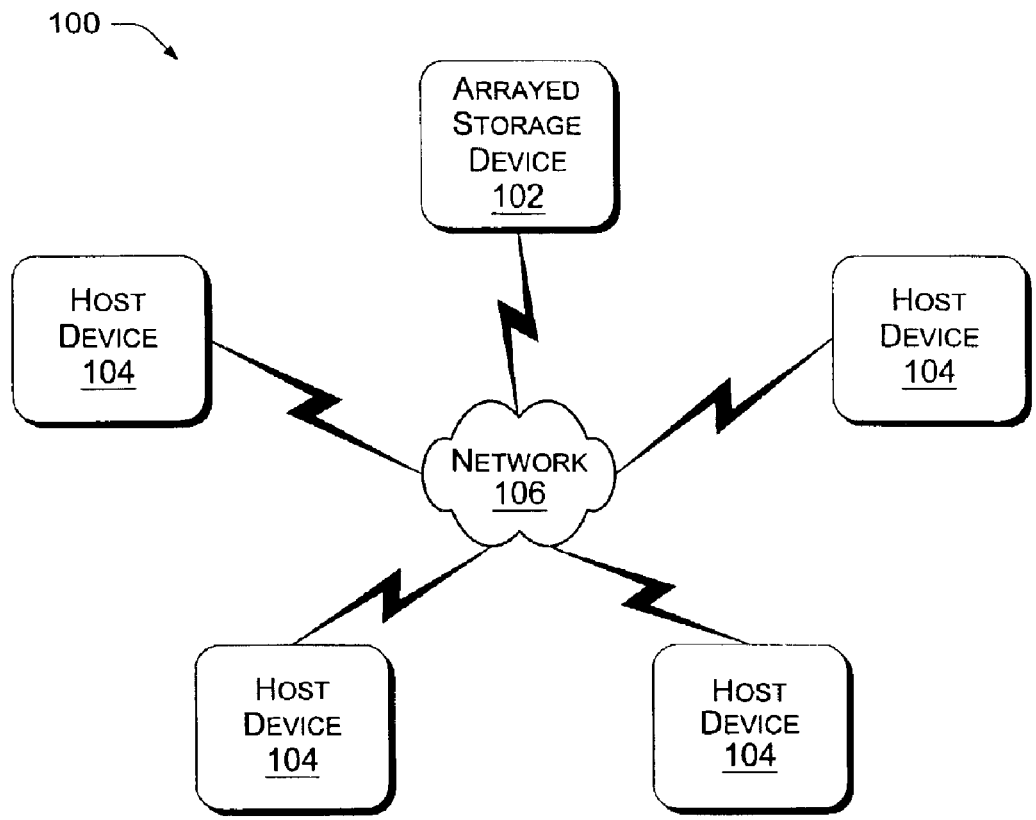
FIG. 1 illustrates a system environment that is suitable for managing data in a multi-level RAID storage array.

Exemplary System Environment For Managing Data In A Multi-Level RAID Storage Array FIG. 1 illustrates a system environment 100 suitable for managing data in a multi-level RAID storage array. The system 100 includes arrayed storage device 102 operatively coupled to host device(s) 104 through network 106. The network connection 106 can include, for example, LAN (local area network), a WAN (wide area network), an intranet, the Internet, a fiber optic cable link, a direct connection, or any other suitable communication link. Host device(s) 104 can be implemented as a variety of general purpose computing devices including, for example, a personal computer (PC), a laptop computer, a server, a Web server, and other devices configured to communicate with arrayed storage device 102.

Although embodiments of arrayed storage device 102 are disclosed herein below as multi-level RAID storage arrays, the arrayed storage device 102 is not limited in this regard. Accordingly, this disclosure is applicable to other configurations of arrayed storage components as currently exist or as might exist in the future that include different array architectures for the general purpose of fault-tolerance and performance/storage trade-offs similar to those provided by currently available RAID levels. Therefore, arrayed storage device 102 more generally refers to a plurality of storage components/devices operatively coupled in an array for the general purpose of increasing storage performance. Storage performance goals typically include mass storage, low cost per stored megabyte, high input/output performance, and high data availability through redundancy and fault tolerance. Storage components/devices operatively coupled within arrayed storage devices 102 may include devices such as magnetic disk drives, tape drives, optical read/write disk drives, solid state disks and the like. Such storage components are generally well known in the art of data storage technology.

In addition, arrayed storage devices 102 as disclosed herein are virtual storage array devices that include a virtual memory storage feature. Thus, the virtual storage arrays 102 presently disclosed provide a layer of address mapping indirection between host 104 addresses and the actual physical addresses where host 104 data is stored within the virtual storage array 102. Address mapping indirection uses pointers that make it possible to move data around to different physical locations within the array 102 in a way that is transparent to the host 104.

As an example of virtual memory storage in a RAID array 102, a host device 104 may store data at host address $H_5$ which the host 104 thinks is pointing to a physical location on disk #2, sector #56, a virtual RAID storage array 102. However, the virtual RAID storage array 102 might relocate the host data to an entirely different physical location (e.g., disk #8, sector #27) within the array 102 and update a pointer (i.e., layer of address indirection) so that the pointer always points to the host data. The host device 104 will continue accessing the data at the same host address $H_5$, but will not known that the data has actually been moved to a new physical location within the virtual RAID storage array 102.

Exemplary Embodiment For Managing Data In A Multi-Level RAID Storage Array

Figure 2:
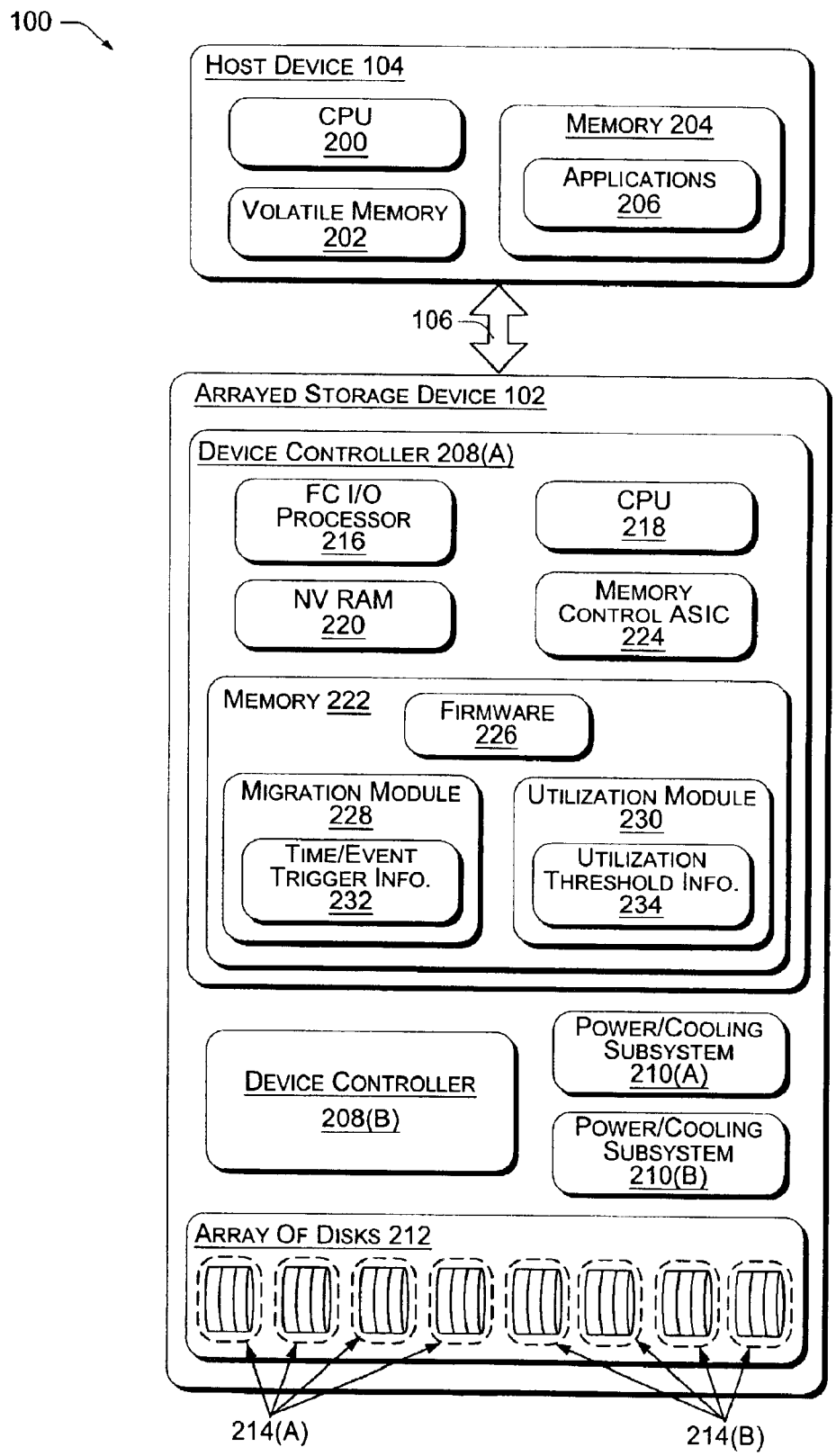
FIG. 2 is a block diagram illustrating in greater detail, a particular embodiment of a host computer device and a multi-level RAID storage array as might be implemented in the system environment of FIG. 1.

FIG. 2 is a block diagram illustrating a particular embodiment of a host computer device 104 and an arrayed storage device 102 as might be implemented in the system environment 100 of FIG. 1. The arrayed storage device 102 of FIG. 1 is embodied in FIG. 2 as a virtual multi-level RAID storage array 102. Host device 104 is embodied generally as a computer such as a personal computer (PC), a laptop computer, a server, a Web server, or other computer device configured to communicate with multi-level RAID storage array 102.

Host device 104 typically includes a processor 200, a volatile memory 202 (i.e., RAM), and a nonvolatile memory 204 (e.g., ROM, hard disk, floppy disk, CD-ROM, etc.). Nonvolatile memory 204 generally provides storage of computer readable instructions, data structures, program modules and other data for host device 104. Host device 104 may implement various application programs 206 stored in memory 204 and executed on processor 200 that create or otherwise access data to be transferred via network connection 106 to RAID storage array 102 for storage and subsequent retrieval. Such applications 206 might include software programs implementing, for example, word processors, spread sheets, browsers, multimedia players, illustrators, computer-aided design tools and the like. Thus, host device 104 provides a regular flow of data I/O requests to be serviced by virtual multi-level RAID storage array 102.

Multi-level RAID array 102 is generally designed to provide continuous data storage and data retrieval for computer devices such as host device(s) 104, and to do so regardless of various fault conditions that may occur. Thus, RAID array 102 typically includes redundant subsystems such as controllers 208(A) and 208(B) and power and cooling subsystems 210(A) and 210(B) that permit continued access to the RAID array 102 even during a failure of one of the subsystems. In addition, RAID array 102 typically provides hot-swapping capability for array components (i.e. the ability to remove and replace components while the array 102 remains online) such as controllers 208(A) and 208(B), power/cooling subsystems 210(A) and 210(B), and disk drives 214 in the array of disks 212.

Disk drives 214 of multi-level RAID array 102 are illustrated in FIG. 2 as disk drives 214(A) and 214(B). This illustration is intended to convey that disk drives 214 employ a plurality of RAID levels. Specifically, disk drives 214(A) employ a higher performing RAID level such as RAID level 1, and disk drives 214(B) employ a lower performing RAID level such as RAID level 5. However, this illustration is in no way intended to indicate that RAID levels are distributed across disk drives 214 in such a uniform or exclusive manner. The illustration of a higher performing RAID level as disk drives 214(A) and a lower performing RAID level as disk drives 214(B) is done for purposes of discussion only. As is known in the art, there are various ways of employing and distributing multiple RAID levels across disks in a multi-level RAID array.

Controllers 208(A) and 208(B) on RAID array 102 mirror each other and are generally configured to redundantly store and access data on disk drives 214. Thus, controllers 208(A) and 208(B) perform tasks such as attaching validation tags to data before saving it to disk drives 214 and checking the tags to ensure data from a disk drive 214 is correct before sending it back to host device 104. Controllers 208(A) and 208(B) also tolerate faults such as disk drive 214 failures by recreating data that may be lost during such failures.

Controllers 208 on RAID array 102 typically include I/O processor(s) such as FC (fiber channel) I/O processor(s) 216, main processor(s) 218, nonvolatile (NV) RAM 220, nonvolatile memory 222 (e.g., ROM), and one or more ASICs (application specific integrated circuits) such as memory control ASIC 224. NV RAM 220 is typically supported by a battery backup (not shown) that preserves data in NV RAM 220 in the event power is lost to controller(s) 208. Nonvolatile memory 222 generally provides storage of computer readable instructions, data structures, program modules and other data for RAID storage array 102.

Accordingly, nonvolatile memory 222 includes firmware 226, data migration module 228, and array utilization module 230. Firmware 226 is generally configured to execute on processor(s) 218 and support normal disk array 102 operations. Firmware 226 is also typically configured to handle various fault scenarios that may arise in RAID array 102. As more fully discussed herein below, migration module 228 is configured to execute on processor(s) 218 and manage data updates such that they are initially written to the lower performing RAID level 214(B). Migration module 228 is additionally configured to migrate or relocate data between RAID levels on disk drives 214(A) and 214(B) in conjunction with utilization module 230.

FC I/O processor(s) 216 receives data and commands from host device 104 via network connection 106. FC I/O processor(s) 216 communicate with main processor(s) 218 through standard protocols and interrupt procedures to transfer data and commands to redundant controller 208(B) and generally move data between NV RAM 220 and various disk drives 214 to ensure that data is stored redundantly.

Memory control ASIC 224 generally controls data storage and retrieval, data manipulation, redundancy management, and the like through communications between mirrored controllers 208(A) and 208(B). Memory controller ASIC 224 handles tagging of data sectors being striped to disks 214 in the array of disks 212 and writes parity information across the disk drives 214. Data striping and parity checking are well-known to those skilled in the art. Memory control ASIC 224 also typically includes internal buffers (not shown) that facilitate testing of memory 222 to ensure that all regions of mirrored memory (i.e. between mirrored controllers 208(A) and 208(B)) are compared to be identical and checked for ECC (error checking and correction) errors on a regular basis. Memory control ASIC 224 notifies processor 218 of these and other errors it detects. Firmware 226 is configured to manage errors detected by memory control ASIC 224 in a tolerant manner which may include, for example, preventing the corruption of array 102 data or working around a detected error/fault through a redundant subsystem to prevent the RAID array 102 from crashing.

As indicated above, migration module 228 is configured to manage incoming data updates such that they are initially written to the lower performing RAID level 214(B). This prevents disruption of foreground processes that are servicing host 104 I/O requests. However, migration module 228 and utilization module 230 are also configured to migrate data between RAID levels on disk drives 214(A) and 214(B) as foreground processes abate.

More specifically, migration module 228 determines if there is data in the higher performing RAID level 214(A) and/or the lower performing RAID level 214(B) that is "migratable data". If there is migratable data, utilization module 230 executes to determine the utilization rate of the RAID array 102. In general, utilization module 230 executes to determine how busy the RAID array 102 is in handling host 104 I/O requests. Utilization module 230 informs migration module 228 if an appropriate time comes when migratable data can be migrated without disrupting the servicing of host 104 I/O requests.

In the current embodiment of FIG. 2, migration module 228 includes time and/or event information 232 also stored in memory 222. The time/event information 232 is used to trigger the execution or initiation of migration module 228. Thus, migration module 228 may execute periodically as dictated by a time factor (e.g., every 5 seconds) stored in time/event information 232. Migration module 228 may also be initiated based on the occurrence of a particular event as identified by event information 232. Such an event may include, for example, the conclusion of a particular process configured to run on processor 218. Time and event factors stored as time/event information 232 are variables that may be tunable by a user or system administrator.

Upon activation, migration module 228 searches for migratable data by comparing the age of data in a low performing RAID level with the age of data in a higher performing RAID level. In general, migration module 228 operates to keep the most active data in the higher performing RAID level 214(A). The most active data is data that has been the most recently written to or updated. Thus, a comparison typically includes comparing update times for blocks of data in the lower performing RAID level 214(B) with update times for blocks of data in the higher performing RAID level 214(A). Blocks of data in the lower performing RAID level 214(B) that have been more recently updated than blocks of data in the higher performing RAID level 214(A) are migratable data. Specifically, these blocks of data will be "promoted", or migrated from the lower performing RAID level 214(B) to the higher performing RAID level 214(A). Conversely, blocks of data in the higher performing RAID level 214(A) that have not been updated as recently as blocks of data in the lower performing RAID level 214(B), are also migratable data. Specifically, these blocks of data will be "demoted", or migrated from the higher performing RAID level 214(A) to the lower performing RAID level 214(B).

As will be recognized by those skilled in the art, additional methods for determining migratable data may exist. For example, migratable data might be determined by comparing the age of updated data with a threshold value. Thus, the above described method of comparing recently updated data blocks between lower and higher performing RAID levels is not meant to limit the manner by which migration module 228 may determine migratable data.

If migration module 228 does not find any migratable data, the migration process terminates. The process begins again when migration module 228 is triggered as discussed above by time/event information 232.

As mentioned above, utilization module 230 executes to determine the utilization rate of the RAID array 102 once migration module 228 locates migratable data. In general, utilization module 230 executes to determine how busy the RAID array 102 is in handling host 104 I/O requests. Utilization module 230 informs migration module 228 if an appropriate time comes when migratable data can be migrated without disrupting the servicing of host 104 I/O requests. Utilization module 230 may terminate the migration process if the utilization rate of the RAID array 102 is not conducive for non-disruptive data migration. Again, the process will be reinitiated when migration module 228 is triggered as discussed above by time/event information 232.

Utilization module 230 monitors the overall utilization rate of RAID array 102 in order to determine the least disruptive time to migrate data between higher 214(A) and lower 214(B) performing RAID levels. Thus, utilization module 230 is responsible for ensuring that data migration occurs as a background process that does not interfere with foreground tasks related to servicing host 104 I/O requests. If performed as a foreground task, data migration might otherwise defeat the general purpose of reducing the overall time to service host 104 I/O requests.

There are various ways utilization module 230 might monitor the utilization rate of a virtual RAID storage array 102. As an example, an optical fiber channel (not shown) is typically used to couple controllers 208 to array of disks 212. The optical fiber channel may have a maximum data transfer rate of 100 megabytes per second. A decrease in the utilization rate of the optical fiber channel generally indicates that host device 104 I/O requests have diminished, leaving excess capacity on the optical fiber channel that can be used for other tasks without adversely impacting host I/O requests. Thus, utilization module 230 monitors the optical fiber channel to determine when the utilization rate drops below a certain utilization threshold 234. Utilization module 230 then notifies migration module 228 that data migration can proceed. As indicated above, there are other components that may be monitored as a way of indicating the general utilization rate of RAID array 102. Use of an optical fiber channel as described above is just one example.

Figure 3:
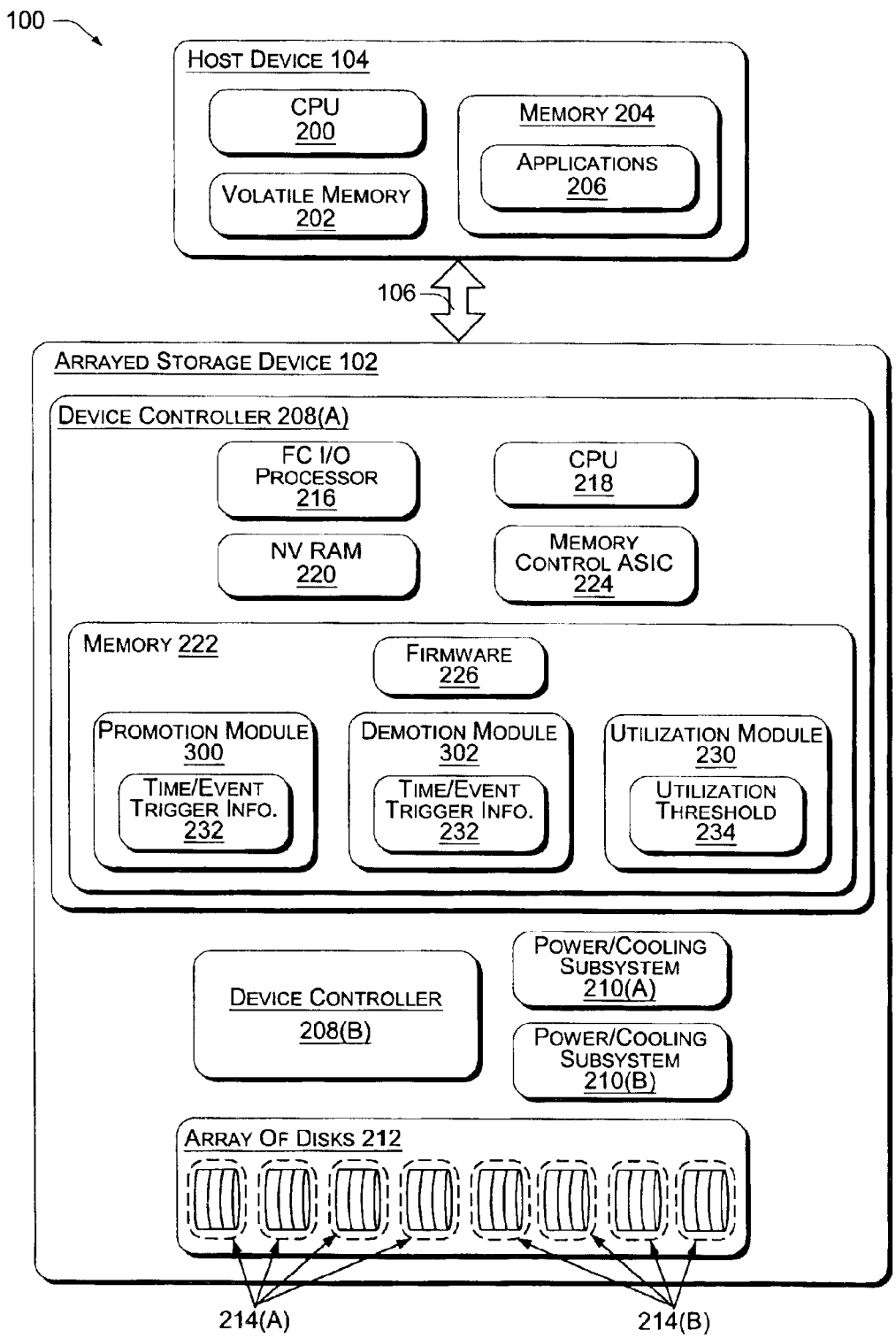
FIG. 3 is a block diagram illustrating in greater detail, another embodiment of a host computer device and a multi-level RAID storage array as might be implemented in the system environment of FIG. 1.

Additional Exemplary Embodiments For Managing Data In A Multi-Level RAID Storage Array FIG. 3 is a block diagram illustrating additional embodiments of a host computer device 104 and an arrayed storage device 102 as might be implemented in the system environment 100 of FIG. 1. Like the embodiment of FIG. 2, the arrayed storage device 102 is embodied as a virtual multi-level RAID storage array 102, and the host device 104 is embodied generally as a computer device. Host device 104 is configured as described above with respect to the FIG. 2 embodiment. RAID storage array 102 is also configured as described above with respect to the FIG. 2 embodiment, except that a promotion module 300 and a demotion module 302 are stored in memory 222 instead of migration module 228.

In the FIG. 3 embodiment, promotion module 300 and demotion module 302 together perform the same general tasks as those described above with respect to the migration module 228 of FIG. 2. Therefore, incoming data updates are managed such that they are initially written to the lower performing RAID level 214(B). However, promotion module 300 and demotion module 302 can be configured to operate separately from one another. In addition, promotion module 300 and demotion module 302 determine which data to migrate between higher 214(A) and lower 214(B) performing RAID levels differently.

Promotion module 300 is triggered as described above by time/event information 232. Upon activation, promotion module 300 looks in lower performing RAID level 214(B) for recently updated data blocks that are promotion candidates. A promotion candidate is a block of data that has been recently updated. Such a data block therefore contains active data and should be promoted to the higher performing RAID level 214(A). A promotion candidate may be a block of data that has been updated within a certain prior period of time as determined by a threshold value, or it may simply be a block of data that has been updated at some previous time but not yet promoted to the higher performing RAID level 214(A).

Utilization module 230 operates as described above when a promotion candidate is found. That is, utilization module 230 monitors the utilization rate of RAID array 102 in order to determine the least disruptive time to promote data from the lower performing RAID level 214(B) to the higher performing RAID level 214(A). Utilization module 230 may terminate the promotion process if the utilization rate of the RAID array 102 is not conducive to non-disruptive data promotion. However, promotion will be reinitiated when promotion module 300 is triggered again by time/event information 232.

Demotion module 302 is also triggered as described above by time/event information 232. Upon activation, demotion module 302 looks in the higher performing RAID level 214(A) for data blocks that have not been written to or updated within a certain period of time as determined by a preset threshold value. Data blocks that have not been written to or updated within such a time are not considered to be active data, and are therefore demotion candidates that should be demoted to the lower performing RAID level 214(B).

Promotion 300 and demotion 302 modules may be triggered to execute concurrently, or they may be triggered by different time/event mechanisms to execute separately.

Exemplary Methods For Managing Data In A Multi-Level RAID Storage Array

Example methods for managing data in a multi-level RAID storage array 102 will now be described with primary reference to FIGS. 4–8. The methods apply generally to the exemplary embodiments of system 100 as discussed above with respect to FIGS. 1–3. The elements of the described methods may be performed by any appropriate means, such as by the execution of processor-readable instructions defined on a processor-readable media, such as a disk, a ROM or other such memory device.

Figure 4:
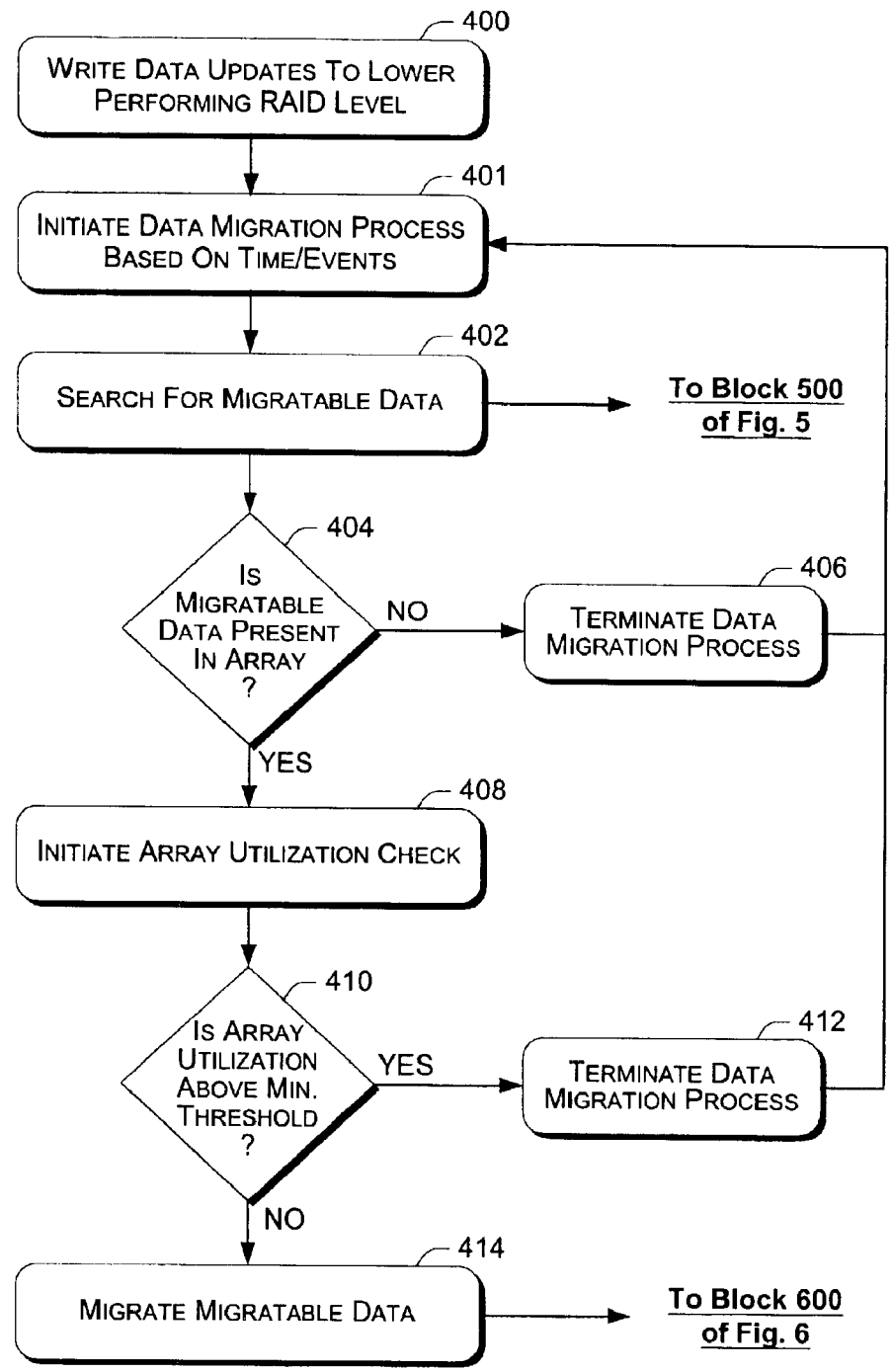
FIG. 4 is a flow diagram illustrating an example method of migrating data between levels in a multi-level RAID storage array such as that illustrated in FIG. 2.
Figure 5:
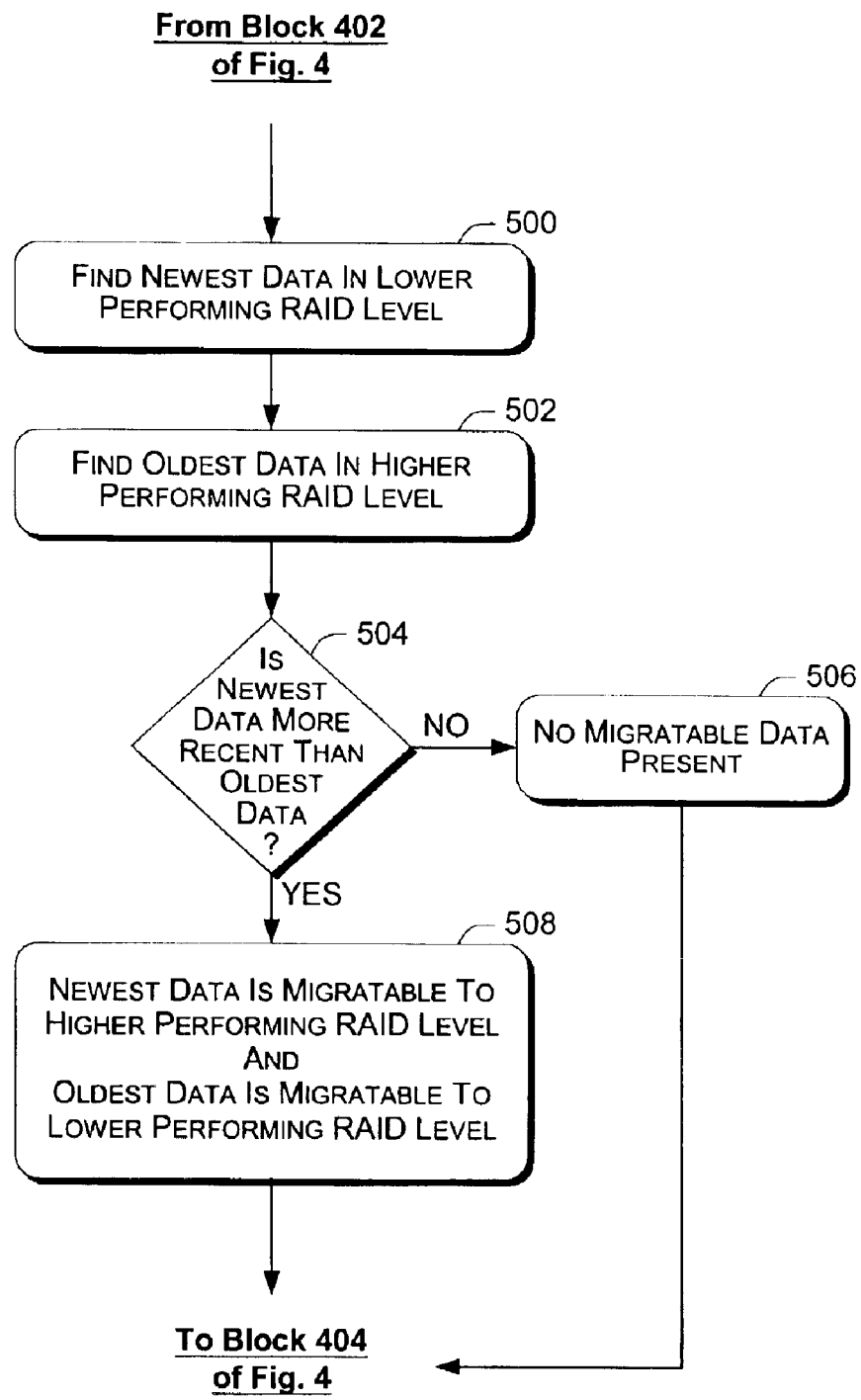
FIG. 5 is a continuation of the flow diagram of FIG. 4.
Figure 6:
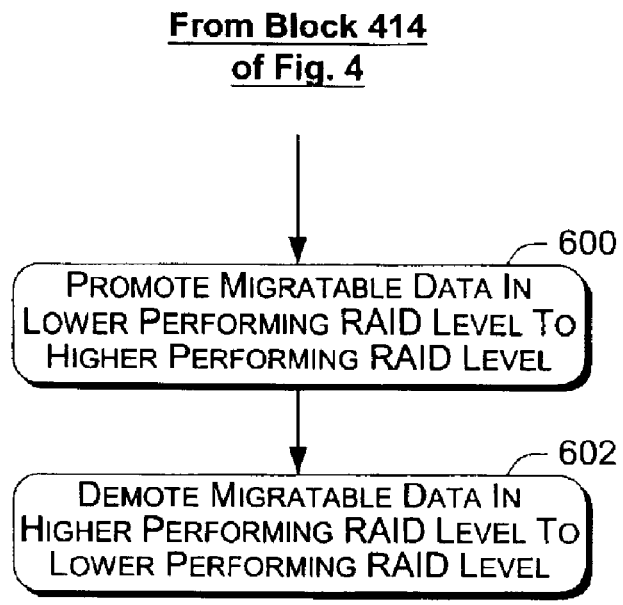
FIG. 6 is a continuation of the flow diagram of FIG. 4.

FIGS. 4–6 are flow diagrams that show examples of general methods for migrating data between RAID levels in a multi-level RAID storage array such as that illustrated in FIG. 2. At block 400 of FIG. 4, data is initially written to a lower performing RAID level within a multi-level RAID storage array 102. At block 401, a data migration process is initiated based on a time or event factor. The process begins with a search for migratable data as shown at block 402.

A method of searching for migratable data is illustrated by the flow diagram of FIG. 5 beginning at block 500. Referring not to FIG. 5, at block 500, the newest or most recently updated data is located in the lower performing RAID level. At block 502, the oldest or least recently updated data is located in the higher performing RAID level. At block 504, a determination is made as to whether the newest data from the lower performing RAID level is more recent than the oldest data from the higher performing RAID level. If it is not, then there is no migratable data present in the RAID storage array 102 as indicated at block 506. However, if the newest data from the lower performing RAID level is more recent than the oldest data from the higher performing RAID level, then both the newest data and the oldest data are migratable. The newest data is migratable to the higher performing RAID level and the oldest data is migratable to the lower performing RAID level as indicated at block 508.

Referring again to FIG. 4, at block 404 a determination is made as to whether migratable data is present in the RAID storage array 102. If there is no migratable data present, the migration process terminates as indicated by block 406. The migration process will be initiated again based on a time or event factor as shown in block 401.

If there is migratable data present in the RAID storage array 102, an array utilization check process is initiated at block 408. At block 410, a determination is made as to whether the array utilization is above a minimum threshold value. If the array utilization is above the minimum threshold, the data migration process can terminate as indicated at block 412. Again, the migration process will be reinitiated based on a time or event factor as shown in block 401.

If the array utilization is not above the minimum threshold, migratable data is migrated to appropriate RAID levels within the RAID storage array 102. Referring to FIG. 6, migration then proceeds with migrating (i.e., promoting) migratable data from the lower performing RAID level to the higher performing RAID level as shown at block 600. Migratable data is also demoted from the higher performing RAID level to the lower performing RAID level as shown at block 602.

Figure 7:
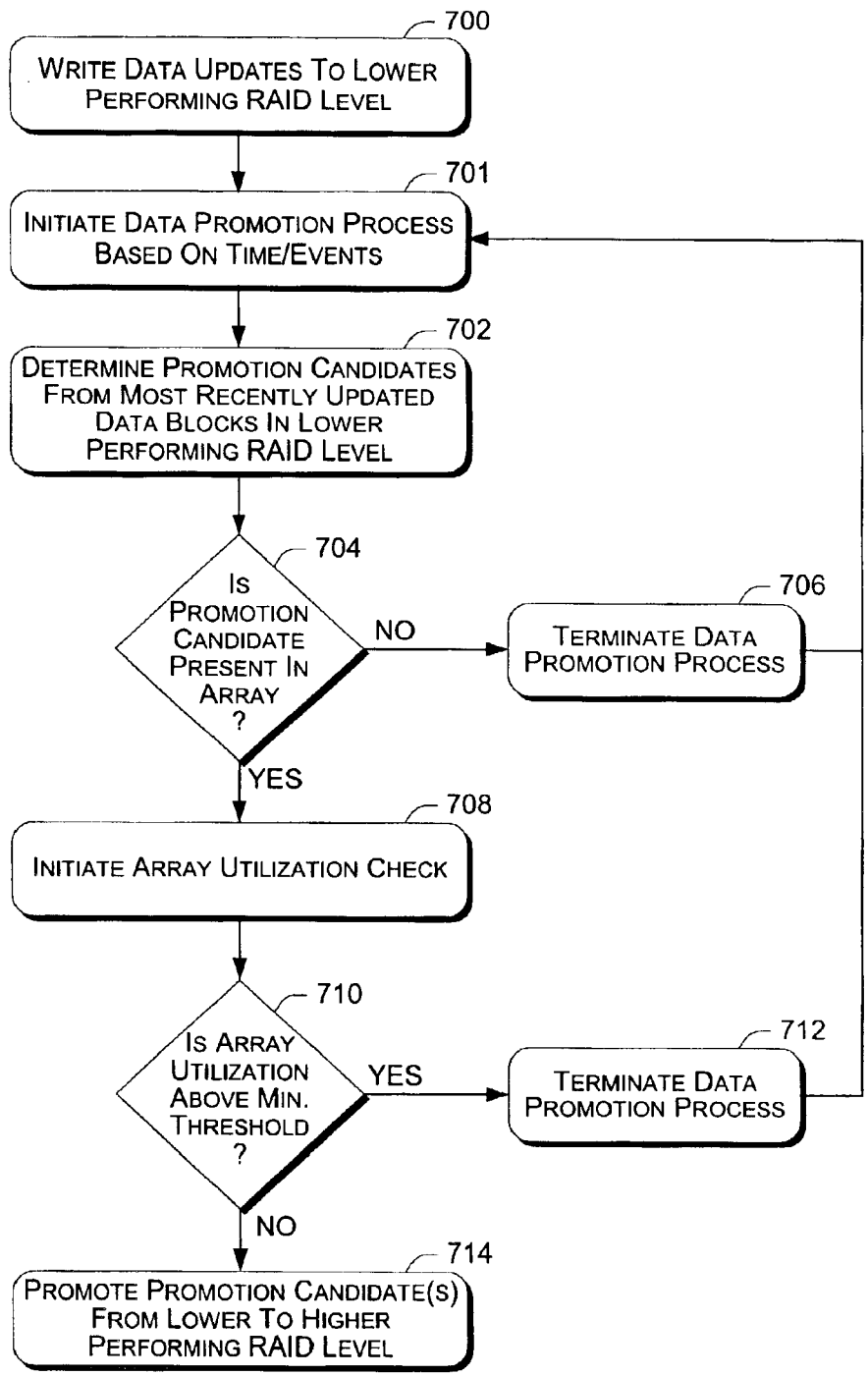
FIG. 7 is a flow diagram illustrating an example method for promoting data from a lower performing RAID level to a higher performing RAID level in a multi-level RAID storage array such as that illustrated in FIG. 3.

FIG. 7 is a flow diagram that shows an example method for promoting data within a multi-level RAID storage array 102 such as that illustrated in FIG. 3. At block 700 of FIG. 7, data is initially written to a lower performing RAID level within a multi-level RAID storage array 102. At block 701, a data promotion process is initiated based on a time or event factor. The production process begins at block 702 with determining whether there are recently updated data blocks in a lowering performing RAID level that are candidates for promotion to a higher performing RAID level. Promotion candidates are generally the most recently updated data blocks and can be determined either by how recent an update has been written to a data block or simply by whether a data block has been updated since a prior promotion process was executed.

At block 704 a determination is made as to whether a promotion candidate is present in the RAID storage array 102. If there is no promotion candidate present, the promotion process terminates as indicated by block 706. The promotion process will be initiated again based on a time or event factor as shown in block 701.

If there is a promotion candidate present in the RAID storage array 102, an array utilization check process is initiated at block 708. At block 710, a determination is made as to whether the array utilization is above a minimum threshold value. If the array utilization is above the minimum threshold, the data promotion process can terminate as indicated at block 712. Again, the promotion process will be reinitiated based on a time or event factor as shown in block 701.

If the array utilization is not above the minimum threshold, promotion candidates are promoted from the lower performing RAID level to the higher performing RAID level at block 714.

Figure 8:
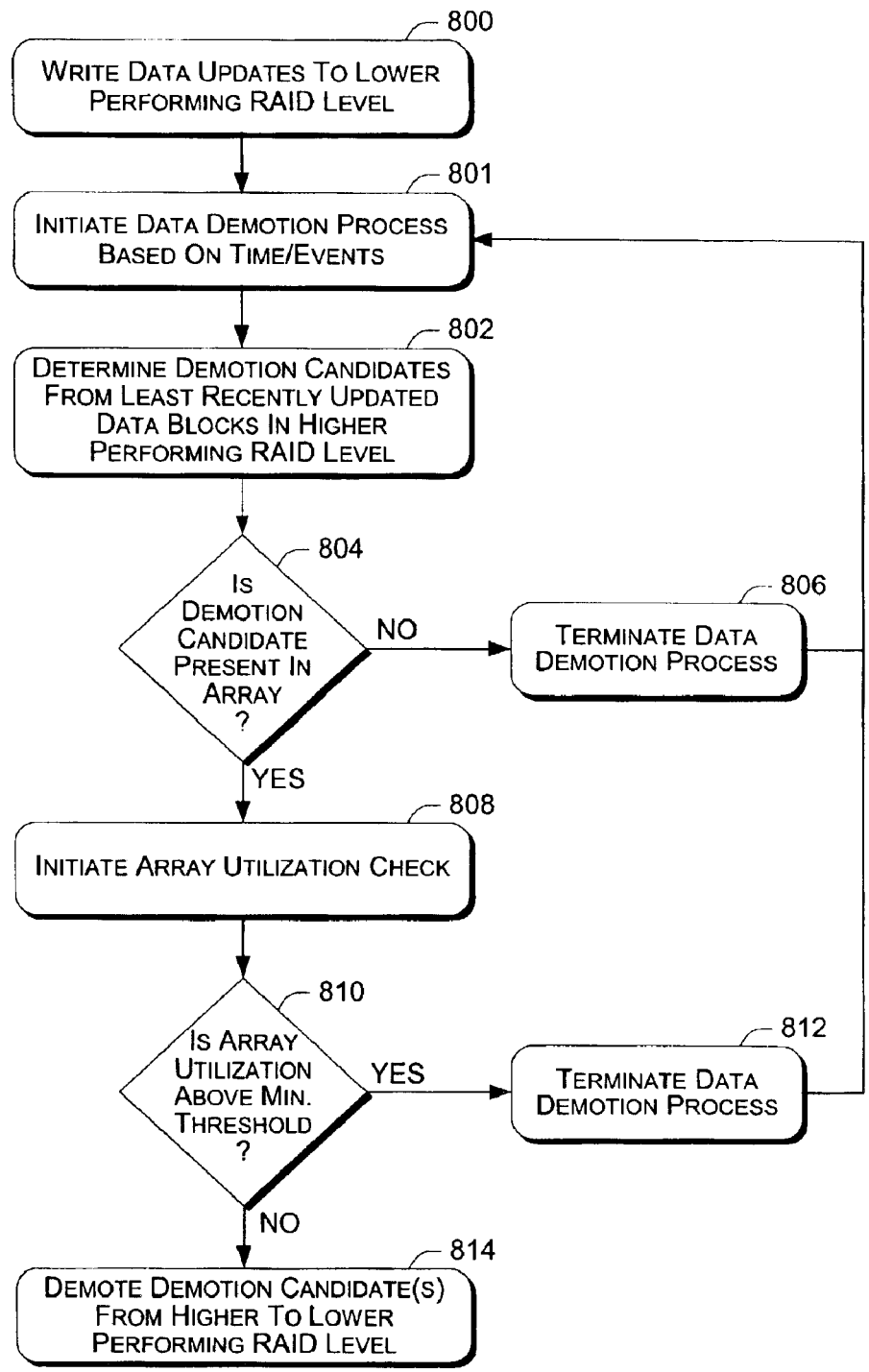
FIG. 8 is a flow diagram illustrating an example method for demoting data from a higher performing RAID level to a lower performing RAID level in a multi-level RAID storage array such as that illustrated in FIG. 3.

FIG. 8 is a flow diagram that shows an example method of demoting data within a multi-level RAID storage array 102 such as that illustrated in FIG. 3. At block 800 of FIG. 8, data is initially written to a lower performing RAID level within a multi-level RAID storage array 102. At block 801, a data demotion process is initiated based on a time or event factor. The demotion process begins at block 802 with determining whether there are data blocks in a higher performing RAID level that are candidates for demotion to a lower performing RAID level. Demotion candidates are generally the least recently updated data blocks in a higher performing RAID level that have not been written to within a certain period of time as determined by a preset threshold value.

At block 804 a determination is made as to whether a demotion candidate is present in the RAID storage array 102. If there is no demotion candidate present, the demotion process terminates as indicated by block 806. The demotion process will be initiated again based on a time or event factor as shown in block 801.

If there is a demotion candidate present in the RAID storage array 102, an array utilization check process is initiated at block 808. At block 810, a determination is made as to whether the array utilization is above a minimum threshold value. If the array utilization is above the minimum threshold, the data demotion process can terminate as indicated at block 812. Again, the demotion process will be reinitiated based on a time or event factor as shown in block 801.

If the array utilization is not above the minimum threshold, demotion candidates are demoted from the higher performing RAID level to the lower performing RAID level at block 814.

The methods of promoting and demoting data within a multi-level RAID storage array 102 as illustrated respectively in FIGS. 7 and 8, may be performed concurrently or separately depending on how time and/or event mechanisms are configured to control these methods.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

Additionally, while one or more methods have been disclosed by means of flow diagrams and text associated with the blocks of the flow diagrams, it is to be understood that the blocks do not necessarily have to be performed in the order in which they were presented, and that an alternative order may result in similar advantages.

What is claimed is:

1. A processor-readable medium in a multi-level RAID (redundant array of independent disks) storage array comprising processor-executable instructions configured for:
    initiating a data migration process;
    searching for migratable data;
    checking an array I/O (input/output) utilization rate if migratable data is found; and
    migrating the migratable data if the array I/O utilization rate does not exceed a minimum threshold.

2. A processor-readable medium as recited in claim 1, comprising further processor-executable instructions configured for terminating the data migration process if migratable data is not found.

3. A processor-readable medium as recited in claim 2, comprising further processor-executable instructions configured for reinitiating the data migration process based on factors selected from a group of factors comprising:
    time; and
    events.

4. A processor-readable medium as recited in claim 1, comprising further processor-executable instructions configured for terminating the data migration process if the array I/O utilization rate is above the minimum threshold.

5. A processor-readable medium as recited in claim 4, comprising further processor-executable instructions configured for reinitiating the data migration process based on factors selected from a group of factors comprising:
    time; and
    events.

6. A processor-readable medium as recited in claim 1, wherein the migrating further comprises:
    promoting newer migratable data to a higher performing RAID level; and
    demoting older migratable data to a lower performing RAID level.

7. A processor-readable medium as recited in claim 1, comprising further processor-executable instructions configured for initially storing newly written data in a lower performing RAID level.

8. A processor-readable medium as recited in claim 1, comprising further processor-executable instructions configured for triggering the initiating based on factors selected from a group of factors comprising:
    time; and
    events.

9. A processor-readable medium as recited in claim 1, wherein the searching further comprises comparing the age of data in a low performing RAID level with the age of data in a higher performing RAID level.

10. A processor-readable medium as recited in claim 1, wherein the locating further comprises comparing the age of data with a threshold age.

11. A processor-readable medium in a multi-level RAID (redundant array of independent disks) storage array comprising processor-executable instructions configured for:
    periodically initiating a data promotion process;
    as part of the data promotion process, determining if data blocks in a lower performing RAID level are promotion candidates;
    if the lower performing RAID level contains a promotion candidate, initiating a utilization check process to monitor an array I/O (input/output) utilization rate; and
    if the array I/O utilization rate reaches a threshold level, promoting promotion candidates from the lower performing RAID level to a higher performing RAID level.

12. A processor-readable medium as recited in claim 11, comprising further processor-executable instructions configured for:
    periodically initiating a data demotion process;
    as part of the data demotion process, determining if old data blocks in the higher performing RAID level are demotion candidates;
    if the higher performing RAID level contains a demotion candidate, initiating the utilization check process to monitor the array I/O utilization rate; and
    if the array I/O utilization rate reaches the threshold level, demoting demotion candidates from the higher performing RAID level to the lower performing RAID level.

13. A processor-readable medium as recited in claim 12, comprising further processor-executable instructions configured for terminating the demotion process if the higher performing RAID level does not contain a demotion candidate.

14. A processor-readable medium as recited in claim 12, wherein the determining if old data blocks in the higher performing RAID level are demotion candidates further comprises comparing an update time of the old data blocks with an update time threshold.

15. A processor-readable medium as recited in claim 12, wherein the data promotion process and the data demotion process are initiated concurrently.

16. A processor-readable medium as recited in claim 12, comprising further processor-executable instructions configured for terminating the demotion process when a higher priority process occurs.

17. A processor-readable medium as recited in claim 11, comprising further processor-executable instructions configured for terminating the promotion process if the lower performing RAID level does not contain a promotion candidate.

18. A processor-readable medium as recited in claim 11, comprising further processor-executable instructions configured for initially writing incoming data updates to the lower performing RAID level.

19. A processor-readable medium as recited in claim 11, wherein the determining if data blocks in a lower performing RAID level are promotion candidates further comprises locating most recently updated data blocks.

20. A processor-readable medium as recited in claim 11, wherein the determining if data blocks in a lower performing RAID level are promotion candidates further comprises comparing an update time for each data block with an update time threshold.

21. A processor-readable medium as recited in claim 11, comprising further processor-executable instructions configured for terminating the promotion process when a higher priority process occurs.

22. A processor-readable medium in a multi-level RAID (redundant array of independent disks) storage array comprising processor-executable instructions configured for:
  periodically initiating a data demotion process;
  as part of the data demotion process, determining if old data blocks in a higher performing RAID level are demotion candidates;
  if the higher performing RAID level contains a demotion candidate, initiating a utilization check process to monitor an array I/O (input/output) utilization rate; and
  if the array I/O utilization rate reaches a threshold level, demoting demotion candidates from the higher performing RAID level to a lower performing RAID level.

23. A processor-readable medium in a multi-level RAID (redundant array of independent disks) storage array comprising processor-executable instructions configured for:
  periodically checking age of data stored in a higher performing RAID level and a lower performing RAID level;
  if a lower performing RAID level data block has been updated more recently than a higher performing RAID level data block, initiating a utilization check process to monitor an array I/O (input/output) utilization rate; and
  if the array I/O utilization rate reaches a threshold level, promoting the lower performing RAID level data block to the higher performing RAID level and demoting the higher performing RAID level data block to the lower performing RAID level.

24. A method for migrating data in a multi-level RAID (redundant array of independent disks) storage array comprising:
  initiating a data migration process in a multi-level RAID (redundant array of independent disks) storage array;
  searching for migratable data;
  checking an array I/O (input/output) utilization rate if migratable data is found; and
  migrating the migratable data if the array I/O utilization rate is at or below a minimum threshold.

25. A method of managing data in a multi-level RAID (redundant array of independent disks) storage array comprising:
  periodically initiating a data promotion process;
  as part of the data promotion process, determining if data blocks in a lower performing RAID level are promotion candidates;
  if the lower performing RAID level contains a promotion candidate, initiating a utilization check process to monitor an array I/O (input/output) utilization rate; and
  if the array I/O utilization rate reaches a threshold level, promoting promotion candidates from the lower performing RAID level to a higher performing RAID level.

26. A method as recited in claim 25, further comprising:
  periodically initiating a data demotion process;
  as part of the data demotion process, determining if old data blocks in the higher performing RAID level are demotion candidates;
  if the higher performing RAID level contains a demotion candidate, initiating the utilization check process to monitor the array I/O utilization rate; and
  if the array I/O utilization rate reaches the threshold level, demoting demotion candidates from the higher performing RAID level to the lower performing RAID level.

27. A method of managing data in a multi-level RAID (redundant array of independent disks) storage array comprising:
  periodically checking the age of data stored in a higher performing RAID level and a lower performing RAID level;
  if a lower performing RAID level data block has been updated more recently than a higher performing RAID level data block, initiating a utilization check process to monitor an array I/O (input/output) utilization rate; and
  if the array I/O utilization rate reaches a threshold level, promoting the lower performing RAID level data block to the higher performing RAID level and demoting the higher performing RAID level data block to the lower performing RAID level.

28. A virtual RAID (redundant array of independent disks) storage array comprising:
  disk drives employing a lower performing RAID level and a higher performing RAID level;
  a data migration module configured to determine migratable data and migrate the migratable data between RAID levels; and
  a utilization module to monitor a utilization I/O (input/output) rate of the array in order to determine when to migrate the migratable data.

29. A virtual RAID array as recited in claim 28, further comprising:
  time and/or event information to trigger execution of the data migration module; and
  utilization threshold information to compare to the utilization I/O rate.

30. A virtual storage array comprising:
  storage components employing a lower performing storage level and a higher performing storage level;
  a data migration module configured to determine migratable data and migrate the migratable data between storage levels; and
  a utilization module to monitor a utilization I/O (input/output) rate of the array and determine when to migrate the migratable data based on the utilization I/O rate.

31. A virtual storage array as recited in claim 30, further comprising:
  time and event information to trigger execution of the data migration module; and
  utilization threshold information to compare to the utilization I/O rate.

32. A virtual storage array as recited in claim 30, wherein the storage components are selected from a group of components comprising:
  magnetic disks;
  tapes;
  optical disks; and
  solid state disks.

33. A virtual RAID (redundant array of independent disks) storage array comprising:
  disk drives employing a lower performing RAID level and a higher performing RAID level;
  a data promotion module configured to execute periodically to determine promotion candidates and to promote the promotion candidates from the lower performing RAID level to the higher performing RAID level at a time when the array is not busy; and a utilization module configured to monitor a utilization I/O (input/output) rate of the array in order to to determine the time when the array is not busy.

34. A virtual RAID (redundant array of independent disks) storage array comprising:

disk drives employing a lower performing RAID level and a higher performing RAID level;

a data demotion module configured to execute periodically to determine demotion candidates and to demote the demotion candidates from the higher performing RAID level to the lower performing RAID level at a time when the array is not busy; and a utilization module configured to monitor a utilization I/O (input/output) rate of the array in order to to determine the time when the array is not busy.

35. A system comprising:

a RAID (redundant array of independent disks) storage array to service data requests from a host computer, the RAID storage array having disk drives employing a lower performing RAID level and a higher performing RAID level;

a data migration module configured to execute periodically and migrate data between RAID levels; and a utilization module configured to execute when migratable data is located and to inform the data migration module when to migrate the migratable data based on an array I/O (input/output) utilization rate.

36. A multi-level RAID (redundant array of independent disks) storage array comprising:

means for initiating a data migration process;

means for searching for migratable data;

means for checking an array I/O (input/output) utilization rate if migratable data is found; and means for migrating the migratable data if the array I/O utilization rate does not exceed a minimum threshold.

37. A multi-level RAID storage array as recited in claim 36, further comprising means for terminating the data migration process if migratable data is not found.

38. A multi-level RAID storage array as recited in claim 37, further comprising means for reinitiating the data migration process based on factors selected from a group of factors comprising:

time; and events.

39. A multi-level RAID storage array as recited in claim 36, further comprising means for terminating the data migration process if the array I/O utilization rate is above the minimum threshold.

40. A multi-level RAID storage array as recited in claim 39, further comprising means for reinitiating the data migration process based on factors selected from a group of factors comprising:

time; and event.

41. A multi-level RAID storage array as recited in claim 36, wherein the means for migrating further comprises:

means for promoting newer migratable data to a higher performing RAID level; and means for demoting older migratable data to a lower performing RAID level.

42. A multi-level RAID storage array as recited in claim 36, further comprising means for initially storing newly written data in a lower performing RAID level.

43. A multi-level RAID storage array as recited in claim 36, further comprising means for triggering the initiating based on factors selected from a group of factors comprising:

time; and events.

44. A multi-level RAID storage array as recited in claim 36, wherein the means for searching further comprises means for comparing the age of data in a low performing RAID level with the age of data in a higher performing RAID level.

45. A multi-level RAID storage array as recited in claim 36, wherein the means for locating further comprises means for comparing the age of data with a threshold age.

* * * * *